Figure 1:
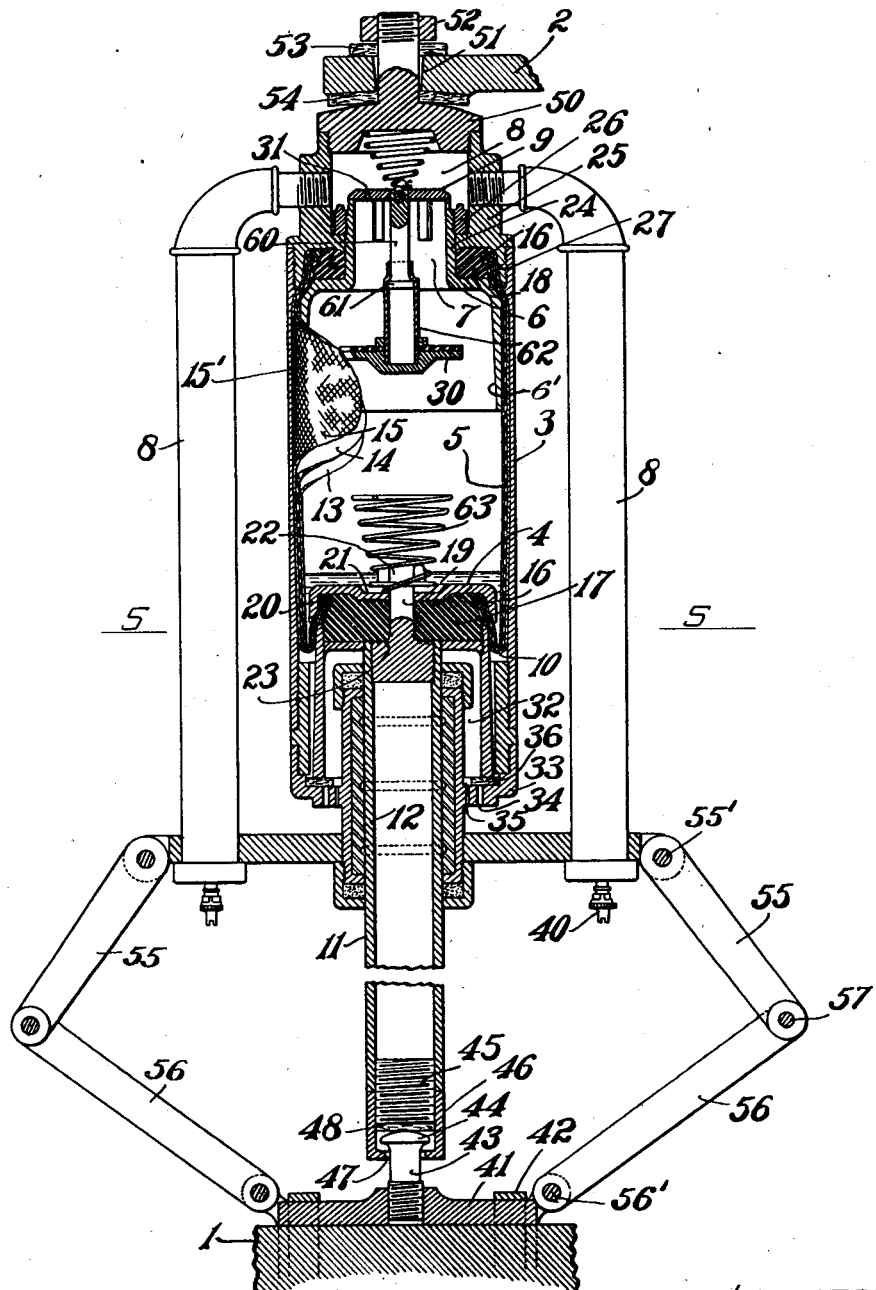

H. E. OXNARD.
EXPANSIBLE CHAMBER.
APPLICATION FILED MAY 18, 1910.
1,119,984.
Patented Dec. 8, 1914.
2 SHEETS—SHEET 2.
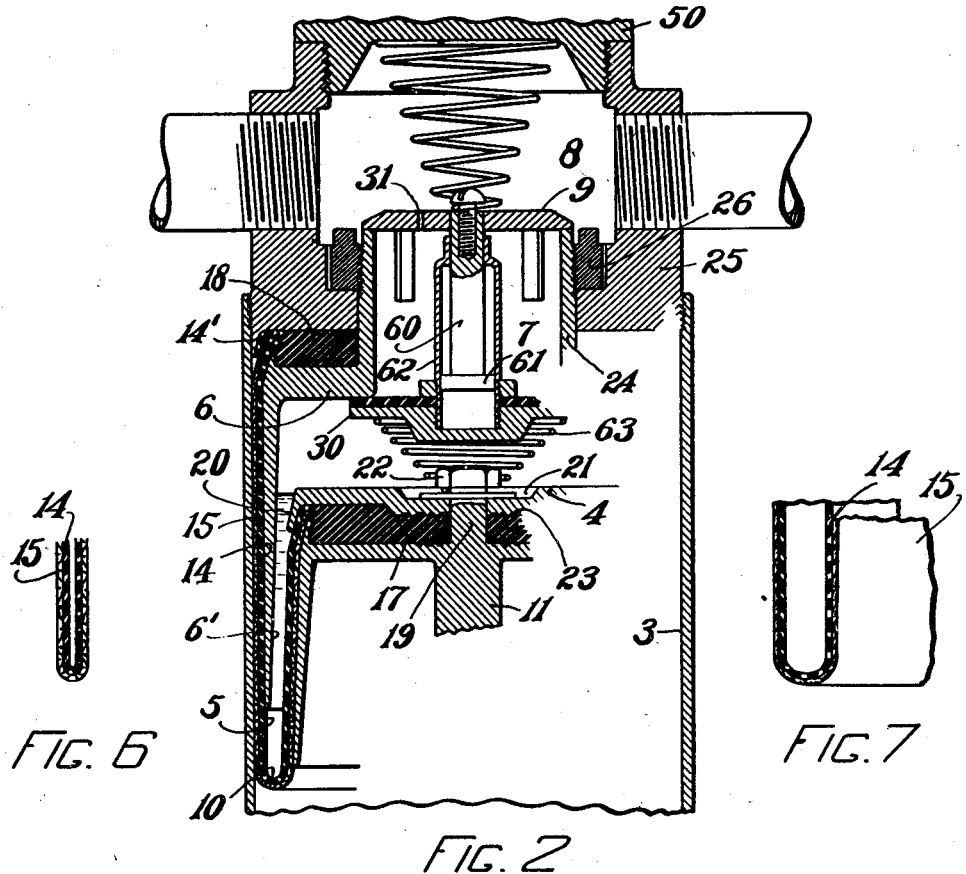
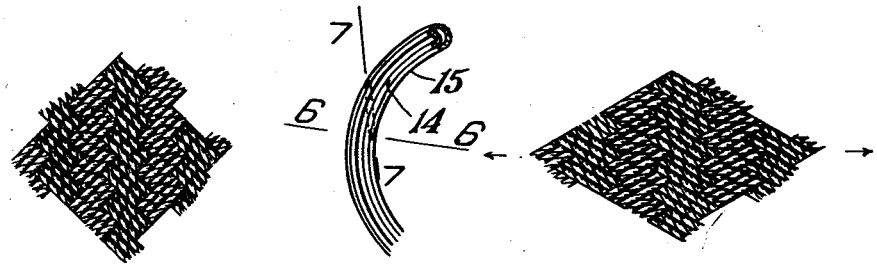
WITNESSES
Harold S. Lyon.
May A. Gyhan
FIG. 8
INVENTOR
HENRY E. OXNARD
BY HIS ATTORNEYS
Mitchell, Chadwick & Kent

UNITED STATES PATENT OFFICE.

HENRY E. OXNARD, OF NEWTON, MASSACHUSETTS.

EXPANSIBLE CHAMBER.

1,119,984.      Specification of Letters Patent.      Patented Dec. 8, 1914.

Application filed May 18, 1910. Serial No. 562,012.

*To all whom it may concern:*

Be it known that I, HENRY E. OXNARD, a citizen of the United States, residing at Newton, in the county of Middlesex and State of Massachusetts, have invented new and useful Improvements in Expansible Chambers, of which the following is a specification.

This invention relates to improvements in expansible chambers.

The object is to make a chamber which can hold a fluid under high pressure, without leakage, and with extensive and almost frictionless variations of volume.

To this end, the invention comprises improvements in means for protecting flexible and fragile walls from rupture under high pressure; preventing leakage; and controlling the pressures when the chamber is approaching its limits of action or is rebounding therefrom; and other features incidental to these.

The invention is related to my co-pending applications for Patent No. 482,542 and No. 562,011, the disclosure in this present case showing some features of improvement upon the devices therein set forth. The invention is herein shown as it may be embodied in a pneumatic spring for a vehicle; but it is applicable to a wide variety of other uses. When embodied in a spring, the invention approximates a result which has been much desired but never before attained, namely, a spring having a wide range of action, the strength of steel, and the perfect resilience of air.

The walls of the chamber include a strong round casing and a plunger within it, these two being joined by a highly flexible septum. The septum is everted or doubled upon itself in a sharp bend or fold. One part of it incases the convex body of the plunger like a sleeve, and the other part fits loosely the surrounding concave surface of the casing. Fluid in the chamber separates the doubled parts of the septum. Except at the fold, the full pressure of the contained fluid upon the septum is sustained by the walls of the plunger or of the casing, which may be of steel or other metal as strong as desired. The invention comprises apparatus in which the width of the fold where the septum is unsupported by metal is very small, and under some circumstances may be almost infinitesimal; in which the septum is very highly flexible so that the resulting sharp fold between the portions is mobile, with the movements of the plunger, without tendency to cause a crack or breach; and in which the rubber or other thin impervious material employed is provided with an expansible non-elastic support composed of fibrous elements so related to each other that the rubber cannot bulge or break through between the fibers. Within reasonable limits, the strength of the device may be practically independent of the fragility of the material composing the septum, and may be limited only by the tensile strength of the steel cylinder.

The ends of the septum are fastened immovably and impermeably to the plunger and casing respectively, from which they may be readily detached at will. There is no rubbing or sliding packing as heretofore used between the plunger and casing to prevent leakage, and thus all internal friction is practically eliminated. The folded and adjacent portions of the septum are prevented from rubbing together by a modification of the cylindrical shape, the plunger and casing being made slightly conical in reverse directions, and in such relation to each other that the space between them has a constant value at the varying positions of the fold.

The invention comprises a chamber made tight by a septum with the special qualities and arrangement hereinafter described; and also means for dividing the tight chamber thus constituted into sections and for controlling the flow of fluid between the sections automatically, to vary the strength of resilience instantaneously according to changing needs and condition of service. When the limit of contraction is approached the section having the moving plunger is automatically separated from the remainder of the chamber, whereby the volume of the contractible chamber is reduced, and consequently the rate of compression of contents is increased, so that further travel of the plunger is gently stopped. Means is provided by the invention for regulating the restoration of communication, thus regulating the return of fluid and the expulsion of the plunger. Means is provided to control the ultimate stage of compression by introducing an incompressible fluid with the compressible fluid in the contractible chamber.

The foregoing and other features of the invention will appear more in detail in the drawings and elsewhere in this specification.

In the accompanying drawings: Figure 1 is an elevation, in section, showing the chamber expanded; Fig. 2 is an elevation, showing a fragment in section, enlarged, showing the chamber contracted and embodying some features of different construction; Fig. 3 is a detail of part of the septum, greatly enlarged; Fig. 4 shows the same extended by a pull in the direction of the arrows; Fig. 5 is a fragmentary plan showing the septum in section on the line 5—5 of Fig. 1, enlarged; Fig. 6 is a fragmentary elevation of the same in section on the line 6—6 of Fig. 5; and Fig. 7 is a fragmentary elevation of the same in section on the line 7—7 in Fig. 5. Fig. 8 is an enlargement of a detail of Fig. 2.

In Fig. 1 is a seen a vehicle axle 1 and a bracket 2 on the vehicle body. Apparatus comprising the spring consists of a strong approximately cylindrical casing 3 forming a chamber which is closed at one end by a plunger 4 and a highly flexible septum 5. A passage 7 leads through the other end 6, to an extension 8 which gives the chamber any desired additional capacity. A valve 9 separates these two sections of the chamber under certain circumstances, as hereinafter described.

The septum is fastened imperviously at each end; is everted or folded cylindrically upon itself at 10 and lies loosely upon the adjacent walls of casing and plunger. The inside diameter of the casing is only a little greater than the diameter of the plunger with the double thicknesses of septum added. The expansive pressure of the fluid within the chamber forces fluid into this little space and separates the portions of the septum, forcing one smoothly against the concave inside of the casing and the other smoothly against the convex outside of the plunger. The distance between these two portions of the folded septum is very short, particularly at the fold. In order to keep the plunger portion of the septum from rubbing against the casing portion, a bearing 12 is provided, suitably lubricated, which holds the plunger stem 11 centrally within the casing 3. When in use the plunger is almost constantly in movement, inward or outward. In Fig. 1 it is shown approximately at its outward limit, and in Fig. 2 approximately at its inward limit. Consequently the fold 10 occurs at various places in the septum. The circumference and area of the septum at any particular place therefore vary in dimension, according to whether that place be at the moment lying on the plunger wall or on the casing wall or between them in the fold.

The septum may be made of three layers 13, 14, 15 of materials closely united into one whole. The middle layer 14 is of rubber, the outer layer 15, which lies against the plunger or the casing, is of stout textile fabric arranged helically; that is, with its threads running obliquely around the cylinder as indicated in Fig. 1, at 15'. The inner layer 13, is of thinner textile fabric, arranged helically. Flexible leather may be used in place of the outer and inner fabrics if desired. All the layers are fastened together adhesively, so that they work as one integral piece. By virtue of its rubber component, the septum is impervious to the fluid. By virtue of its outer component, excessive distention of rubber at the fold is prevented. The inner layer 13 is of value in strengthening the septum and in protecting the rubber from abrasion or injury. It may be omitted under some circumstances, and is omitted in the arrangement portrayed in Fig. 2. By virtue of its said arrangement, the fabric is capable of expansion or contraction to fit smoothly casing or plunger. Fig. 3 indicates one form of said arrangement in which threads are woven or interlaced together forming a fabric, and are so arranged that when the septum stands vertically as represented in Fig. 2, the threads run obliquely, as represented in Figs. 1, 3 and 4. The normal condition of such a fabric is shown in Fig. 3, where the threads are arranged close together making a firm fabric. The interlacing of the threads prevents any two adjacent threads from being separated enough to allow high pressure of fluid to force a bit of the rubber between them. At the same time the fabric is expansible. For example, by pulling in the direction shown by the arrows in Fig. 4, the fabric may be drawn into the shape shown in that figure, in which one dimension of the fragment seen in Fig. 3 has been considerably elongated. Thus the fabric may fit or lie smoothly on either the surface of the plunger and the larger surface of the casing; being expansible and at the same time not elastic; and having a limit to its expansibility at which it resists firmly any further expansion. This limit is represented in Fig. 4. Although the threads are supposed to be close together in Fig. 3, they are closer together in Fig. 4, where each thread is subject to a higher degree of compression laterally; while by reason of the change or angle there is an extension of the fabric in one direction. The fact that the extension is accompanied by a contraction in the other direction is no detriment, as the expansion occurs at the fold, where at the same instant the threads are crowded more tightly together, it will be seen that the fabric automatically strengthens itself, as it were, to hold the rubber at the place where the danger arises. The greater the bursting force exerted by the chamber contents, the greater is the tendency of the septum to bulge or be elongated at its fold, and coincidently with this is the greater crowding together of the threads providing increased resistance to penetration of the supporting fabric by the rubber.

Another advantage incidental to helical arrangement of the fabric having interlaced threads is illustrated in Figs. 5, 6 and 7. By making the space between casing and plunger very narrow where the fold lies, so that the two limbs of the septum on opposite sides of the fold are close together, a very sharp fold may be formed. Owing to the smallness of unsupported area of septum thus produced, the total bursting stress applied to this unsupported part of the septum is so small that it may become negligible, for the reason that the steel or metal forming the casing may burst before stress applied to the septum is great enough to break through its relatively fragile material at the fold. For some purposes, it may be suitable to have a space between the two limbs of the septum at the fold about equal to the double thickness of the septum, which is illustrated in Fig. 2. For other purposes it may be desired to reduce this to a minimum as illustrated in Fig. 1, in which the space is materially less than the thickness of the septum. In the course of constant use, it may be supposed that the septum would suffer severely from the wear incidental to being repeatedly folded at such a sharp angle. By means of the said arrangement such evil effects are obviated. What may be termed the net angle between the two limbs of the septum may be very sharp as illustrated in Figs. 1, 5 and 6, and yet the actual angle between the two limbs of an individual thread is a gentle curve as illustrated in Figs. 5 and 7, where the dotted lines in Fig. 5 and full lines in Fig. 7 show the course of a thread in passing the fold. It is believed that an effect to some extent similar might be obtained by the use of a knit-ribbed fabric in place of that here illustrated.

An impervious joint and fastening of the septum to the plunger and to the cylinder is shown in Fig. 1 in which each end of the septum is bent around a metal ring 16. The inner fabric 13 stops short. The rubber layer 14 thus exposed is in contact with a mass of soft rubber 17 on the plunger head or a similar mass 18 on the cylinder head. The annular mass of rubber 17 is mounted on a stud 19 which projects axially from the plunger head. The rubber is covered by a metal cap 4 which is loose on the same stud. This cap has flanges 20 adapted to inclose circumferentially the end of the septum, and has a central portion 21 which bulges toward the rubber mass. When the nut 22 is screwed on stud 19, it forces the bulging central portion of the cap into the rubber mass 17. The excessive compression of the central part of the rubber, due to this pressure in an axial direction, seeks relief by expansion radially. Thus the edge of the rubber mass 17 is tightly pressed against the side of rubber layer 14, so that leakage between them is impossible. Escape of air between the mass 17 and the stud 19 is prevented by a corrugated surface 23 on the body of the plunger. The pressure of nut 22 forces the corrugations into the rubber and makes a series of tight closures through which no fluid can pass. Thus the plunger end of the septum is sealed.

At the other end of the chamber the fastening is similar. The disk 6 has a screw threaded stem 24 passing loosely through the screw plug 25 which constitutes the cylinder head. By a nut 26 it may be drawn tight, thus compressing the rubber mass 18 in an axial direction and expanding it in a radial direction against the septum rubber 14 which lies within the side walls 27 of the cup or depression in the inner face of the plug, in which the rubber mass lies.

The rings 16 may be omitted if desired. In Fig. 2 a somewhat different arrangement is illustrated. The layer 13 is omitted. An auxiliary rubber strip or connector 14' folded over the ends of the septum is employed, forming a rubber-to-rubber connection from the rubber of the septum to the rubber bed at the chamber end.

In all of these arrangements rubber cement may be inserted between the contiguous rubber surfaces, thus assisting the impermeability of the joint; and the rubber surfaces are nevertheless easily separable for removing the septum, when the mechanical obstructions are removed.

In order to guard the septum against liability of abrasion notwithstanding the very small distance which may exist between its two limbs several coöperating devices are illustrated. One feature provided for this purpose is the making of a very long bearing 12 in which the plunger stem 11 fits; thus minimizing the lateral deflection of the plunger rod which would accompany any wear of the bearing. Another feature is the design of a plunger, stem and bearing such that when expanded the head of the plunger is close to the end of the bearing, as illustrated in Fig. 1. The degree of lateral displacement to which the plunger may be subject is multiplied according to the proportional distance of the plunger head from the nearer end of its supporting bearing 12. The construction last mentioned is therefore provided so that the greatest distance of the plunger head from the nearer end of its bearing 12 shall be approximately the minimum possible by locating such bearing within the plunger side walls on which the septum lies in contracted position, and as close as possible to the position of the plunger head when at its extreme position of expansion.

Another feature of construction to guard the septum against abrasion if the plunger by wear should become loose in its bearing and sway sidewise when the chamber is contracted consists in the construction of the inmost part of the casing of larger diameter than the other part, near the bearing 12. In Fig. 1 the increase is gradual from the point where the fold 10 lies in Fig. 1 to the point where the fold 10 lies when at its inner extreme position (illustrated in Fig. 2). The diameter of the plunger body may vary from the diameter of the portion against which the fold 10 lies in Fig. 1 to the larger diameter of the portion of plunger against which the fold 10 lies when in the position illustrated in Fig. 2. The result is that more clearance or space from the head of the plunger to the adjacent casing is provided when it projects farthest from its bearing 12 and therefore is most liable to side sway, without materially altering the extremely narrow space between plunger and casing at the place where the fold 10 of the septum lies whether the chamber be expanded or contracted. When the plunger and the fold 10 of the septum move inward from the position of Fig. 1, the fold, as it moves inward on the wall of the casing, and at the same time outward on the wall of the plunger finds that the casing becomes gradually of increased diameter, and that the diameter of the plunger adjacent to the fold at the same instant is correspondingly larger. It will be understood that if suitable provision be made to guide the plunger accurately in the center of the casing this arrangement need not be made. Any suitable means may be employed to guide the plunger; and ordinarily this provision of increased clearance may not be needed. In Fig. 2 the clearance space is shown occupied in part by a metal shield 6', which is a continuation of the head disk 6, and which may act as additional protection in case of excessive side sway of the plunger. It is believed however, that in ordinary practice such a protection will not be needed. Attention is particularly called to the fact that although considerable space is shown between the plunger head and casing in Fig. 2, the space between the opposite parts of the septum at its fold is but little; and no part on the plunger projects radially to a diameter great enough to encounter any part of the septum lying on the casing so that if desired the width of fold might be designed of almost infinitesimal size, (Fig. 1) making the net strength of chamber practically independent of the strength of the flexible septum material and dependent only on the strength of the rigid metal casing.

It may be desired that the apparatus act with easy resilience in absorbing ordinary shocks with a travel of ten or fifteen centimeters, and yet in case of a severe shock have a resistant resilience such that it will come to a gentle stop within a short distance farther. If may also be desired to retard the rebound of the plunger from this position of severe compression. For these purposes provision is made for an automatic variation in the capacity of the chamber. An enlargement is provided to a capacity greater than that the chamber would have if its dimensions were fixed by the diameter of casing and the length of the plunger travel, and provision is made for a separation of the chamber into two parts, with suitable control valves between them, and for a reduction of the expansible volume in the expansible one of these parts by insertion of an incompressible fluid.

Through the stem 24 a copious passage 7 leads to another portion or extension 8 of the chamber, which may be located in any convenient place and which may have any desired size or shape. When the end walls 4 and 6 of the main chamber approach each other, the air passes freely out through passage 7, until those walls have approached so close together that a valve 30 actuated by the plunger head closes the passage 7 as shown in Fig. 2. Until this occurs, the mutual approach of walls 4 and 6 has been compressing air in the entire chamber including its extension 8. A shock sufficient to move the plunger only a short distance, for example two or three centimeters produces but a small change of volume of the entire chamber, and the apparatus acts with easy resilience. If the plunger moves far enough to close the valve 30, further movement acts on only the small volume of air remaining in the main chamber, and produces a larger proportionate reduction of volume, and correspondingly larger increase of compression until the movement of the plunger is arrested, which follows quickly and gently after the closing of valve 30. To get the full benefit of the extension the passage thereto should be ample in size to not retard appreciably the escape of air occasioned by initial inward movement of the plunger. A force which thus compresses the apparatus is usually momentary. Upon its cessation the air which has been compressed begins to expand immediately to drive the plunger out. Valve 9 prevents rapid return of air from the extension. The elasticity of the small volume of air in the main chamber is sufficient to start the plunger outward, but its expansive power is soon exhausted against the weight of the vehicle resting upon it, ejecting the plunger but little. Additional fluid, to sustain this ejection, and gradually to eject the plunger farther, enters through the small by-passage 31. This causes a gradual and gentle return of the plunger to its normal position. Thus the rapidity of rebound which would otherwise result when the action of the compressing force has ceased is retarded; and oscillation or expansion past the normal position is avoided.

An auxiliary device consists in the introduction of a quantity of non-compressible fluid such as water, mercury, or a mixture of alcohol and water, or any suitable liquid which fills a part or all of the annular space in the chamber between the limbs of the septum when the chamber is contracted as seen in Fig. 2. This reduces the net volume of compressible fluid to that which may be contained in the space between the head 6 and the top of the liquid. Without this, the contents of the annular part surrounding the plunger at extreme contraction of the chamber might in some cases be so great that even extreme insertion of the plunger would not compress the fluid enough to equalize the shock. The plunger would then strike the head of the chamber, which the use of this liquid effectually prevents.

The construction of the valve arrangements for the passage 7 is as follows: The check valve 9 is seated by a weak spring which yields easily to permit escape of air from section 3, but which when seated permits the return of air only through a very small by-passage 31. Depending from this valve is a pin 60 having a head 61 engaged in and moving easily longitudinally in a tube 62 fast to a lid valve 30. When the chamber is expanded, the valve 30 hangs from the head of this pin, as shown in Fig. 1. When the chamber has contracted to a certain degree the spring 63 on the plunger head engages the underside of valve 30, and begins to push the valve toward its seated position, covering the passage 7 which is represented in Fig. 2. When the valve is seated escape of air from chamber 3 is cut off by the positive compression of the lid on its seat. Further compression of the air confined therein ensues, the spring 63 yielding further until the advance of the plunger ceases. With the ensuing expansion, the valve 30 opens; but air returns no faster than permitted by the by-passage 31. The boss on the underside of the valve 30 may serve to center the spring 63 if necessary in making contact with the valve. The parts may be so designed that under the influence of light or ordinary shocks, the valve 30 will not close, because the chamber is not sufficiently compressed, but on extreme shocks the spring 63 will reach and close this valve, and in either case the ensuing expulsion will be slowed by the action of the valve 9.

An auxiliary device to assist toward the same result is seen at the other end of the apparatus, where an auxiliary chamber 32 on the outer side of the plunger is provided. This chamber lies between the plunger and a plate 33 which closes the end of the casing. When the plunger is forced into the casing, air is drawn through passages 34 and 35 into the auxiliary chamber 32, lifting the annular pad or washer 36. When the plunger moves outward the escape of this air is retarded by the pad 36 which closes passages 34, allowing air to escape only through the small passages 35.

For initial introduction of air to the main chamber and extension a check valve is provided at 40, which may be of any ordinary or suitable type such as is now customary for pneumatic tires or otherwise.

The connection of the apparatus to the body and the axle of a vehicle may be of any suitable sort. In the drawings the axle is represented as having a plate 41 held upon it by straps 42. A stout pin 43 having a rounded head 44 projects from this plate. By means of a plug coupling 45, a cup 46 is fastened upon the end of the plunger stem. The bottom of this cup has a hole 47 large enough for all of the pin 43 to pass through except its head 44, which is thus held in a socket. A leather buffer pad 48 intervenes between the rounded head 44 and the end of the plug 45. Normally, the weight of the vehicle passes downward through the casing, the fluid within it, the plunger, the plunger stem 11, the plug 45, and the pad 48, to the head 44 and thence to the axle. When one end of the axle is lifted by encountering an obstacle, or when the vehicle body rocks, the parts 44 and 48 roll upon each other a little.

For connecting the casing 3 to the vehicle body a stem 50 is screwed into the stock 25 of the cylinder head. This stem passes loosely through a hole 51 in a bracket 2 on the vehicle body. It is held on this bracket by a nut 52. Leather buffer pads 53, 54 intervene. The part 50 has a rounded surface on which the pad and bracket 2 rest. When one side of the vehicle body is raised or depressed, these rounded surfaces roll slightly upon each other. The diameter of hole 51 becomes gradually larger as it rises through the bracket to permit this. The bottom of the hole is about the size of the stem 50, thus preventing lateral movement thereof.

Too great a rolling sidewise of the vehicle body with respect to the axle is prevented by the links 55, 56. These are pivoted at 55′ to a part extending rigidly from the plunger stem; at 56' to the axle plate; and at 57 to each other. The pivots which are seen in cross section, may be as long as desired. The longer their bearings on said links the more firmly do they resist torsion or side swaying of the vehicle body with respect to the axle; while a slight looseness of these bearings, or a slight elasticity in the links, would permit enough ease of motion to eliminate unpleasant rigidity. It will be obvious that as many of these sets of links may be used as are suitable for the need. In particular, the links represented in Fig. 1 would prevent undue swaying of the spring and vehicle body toward or from the eye; that being the direction of the axes of the pivot pins 55', 56' and 57; and to prevent such swinging toward the right or left of the figure another set of links with pivot pins running in that direction might be provided.

I claim:

1. In combination with an expansible chamber comprising a round casing, and a plunger and everted sleeve septum fitting close within it; a stem external to the chamber, extending within the plunger and septum to the head of the plunger, and an external bearing for said stem located when the plunger is withdrawn, within that part of the plunger whereon the septum lies when the plunger is inserted.

2. An expansible chamber comprising a round casing, a plunger and an everted sleeve septum joining them; the septum being fastened to the plunger, and to the casing at a point beyond the plunger's travel; and a metallic shell within the septum surrounding the plunger's inner travel.

3. An expansible chamber comprising a round casing, a plunger and an everted sleeve septum joining them; the inner circumference of the casing being progressively larger from the location of septum fold toward the inner end of chamber and the plunger progressively larger from the location of septum fold toward its outer end, whereby a uniformity of space between plunger and casing attends movements of the septum fold.

4. The combination of a round casing and a plunger forming one section of an elastic chamber; another section of said chamber; there being a copious passage between the sections; a valve, normally open, adapted to close said passage when a predetermined movement of the plunger occurs; and a seat whereon the pressure in the said plunger section tends to force the valve when closed.

5. The combination of a round casing and a plunger forming one section of an elastic chamber; another section of said chamber; there being a copious passage between the sections; a valve adapted to close said passage; a seat whereon the pressure in the said plunger section tends to force the valve; and means actuated by the plunger to close the valve when a predetermined movement of the plunger occurs.

6. The combination of a round casing and a plunger forming one section of an elastic chamber; another section of said chamber; there being a copious passage between the sections; a valve adapted to close said passage; a seat whereon the pressure in the said plunger section tends to force the valve; means actuated by the plunger to close the valve when a predetermined movement of the plunger occurs; and an elastic connection interposed between the valve and plunger, whereby the plunger may continue its movement after seating the valve.

7. The combination of a round casing and a plunger forming one section of an elastic chamber; another section of said chamber; there being a copious passage between the sections; a check valve in the passage, retarding flow to the plunger section; another valve, for preventing flow from the plunger section; and means whereby the plunger actuates the second valve when deeply inserted in the casing.

8. The combination of a round casing and a plunger forming one section of an elastic chamber; another section of said chamber, there being a copious passage between the sections through the head of said round casing opposite the plunger; and a valve, normally open, comprising a lid adapted to be seated by the plunger in position covering said passage.

9. The combination of a round casing and a plunger forming one section of an elastic chamber; another section of said chamber; there being between the plunger and the casing a highly flexible everted sleeve septum joined to both; a stem and bearings wholly outside the chamber for guiding the plunger; a copious passage between the said sections of the chamber; and a lid valve and seat therefor within the chamber controlled by the inner end of the plunger and adapted to close the passage.

10. The combination of a round casing and a plunger forming one section of an elastic chamber; another section of said chamber; there being between the plunger and the casing a highly flexible everted sleeve septum joined to both; a stem and bearings wholly outside the chamber for guiding the plunger; a copious passage between the said sections of the chamber; a lid valve and seat therefor within the chamber, adapted to close the passage; and a compressible spring intervening between said valve and the plunger, whereby approach of the plunger moves the valve to closed position, and allows further movement of the plunger.

11. An expansible chamber comprising a round casing, a plunger within it, and an everted sleeve septum joining the two and fitting the surface of both; with a quantity of liquid; the whole arranged for the liquid to occupy space within the chamber between the plunger and casing portions of the everted septum; whereby compressible fluid is excluded from said space of the chamber.

12. A spring, comprising a chamber; means to separate a section thereof from the remainder; a movable wall comprising one wall of the section whose movement varies the volume of said chamber, a compressible elastic fluid in the chamber; means whereby the fluid under normal working conditions may move from said section into the remainder of the chamber approximately without retardation when the section is not separated from said remainder; the separating means being adapted and arranged to act at a predetermined position of the movable wall.

13. A spring, comprising a chamber; a movable wall, comprising one wall of the chamber; a partition adapted to be interposed between said wall and a portion of the chamber, cutting off from said portion a section of the chamber bounded by said movable wall; a compressible elastic fluid in the chamber; means whereby the fluid under normal working conditions may move from said section into the remainder of the chamber approximately without retardation when the section is not separated from said remainder; the separating means being adapted and arranged to act at a predetermined position of the movable wall.

14. A spring, comprising a chamber; a movable wall comprising one wall of the chamber; a compressible elastic fluid in the chamber; means whereby the fluid under normal working conditions may move freely throughout the chamber approximately without retardation corresponding to the movement of said wall; means for suddenly limiting the portion of said chamber in which the fluid may so move; said means being adapted and arranged to act at a predetermined position of the movable wall.

15. A spring, comprising a chamber; means to separate a section thereof from the remainder; a movable wall comprising one wall of the section whose movement varies the volume of said chamber, a compressible elastic fluid in the chamber; means whereby the fluid under normal working conditions may move from said section into the remainder of the chamber approximately without retardation when the section is not separated from said remainder; the separating means being adapted and arranged to act at a predetermined position of the movable wall, the said remainder of the chamber having a considerable volume close to said separating means, whereby the movable wall acts upon the whole chamber as a unit in point of time when not separated therefrom.

Signed by me at Boston, Mass., this 16th day of May, 1910.

HENRY E. OXNARD.

Witnesses:
 HAROLD S. LYON,
 EVERETT E. KENT.